(No Model.) 2 Sheets—Sheet 1.
L. CLAXTON.
PNEUMATIC TIRE.
No. 573,444. Patented Dec. 22, 1896.
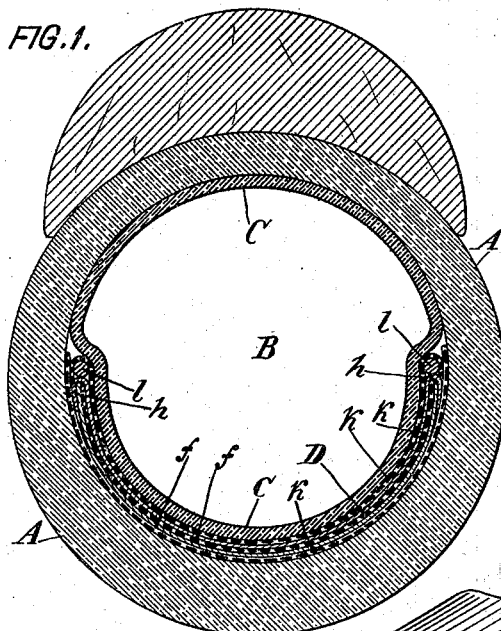
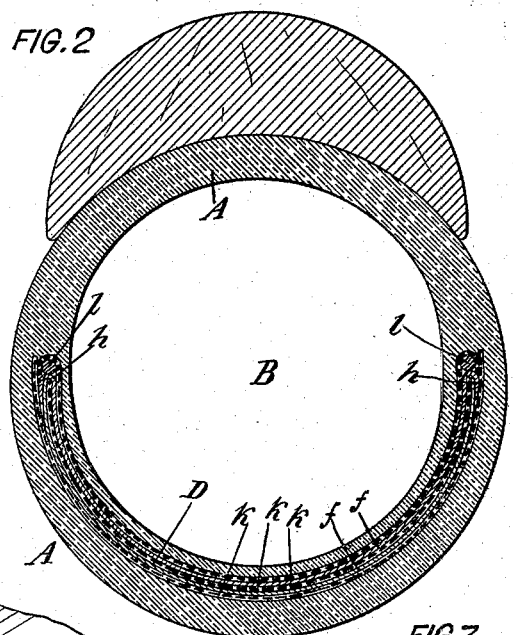
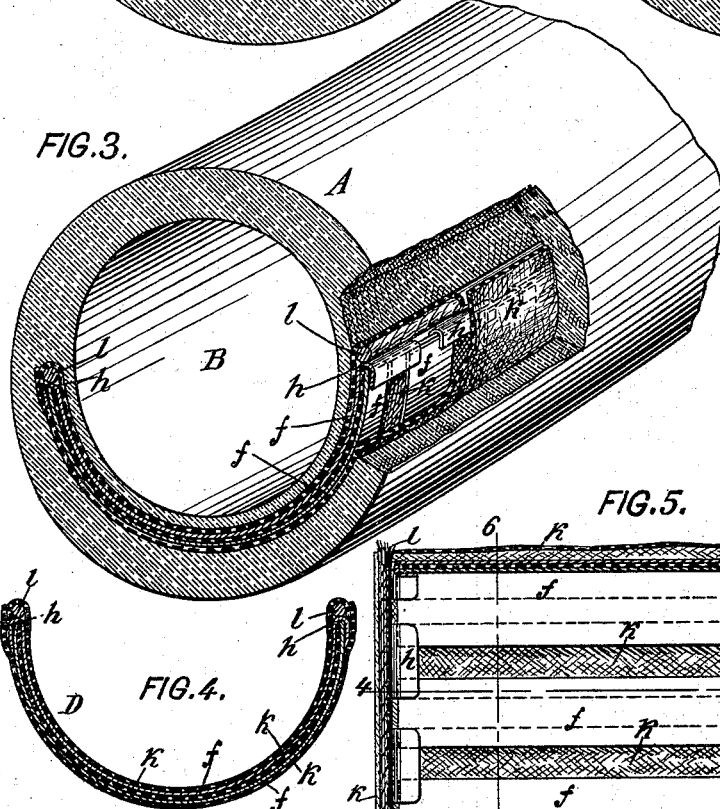
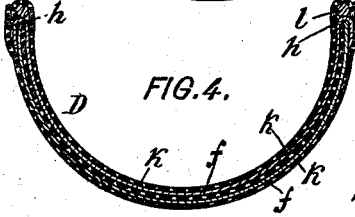
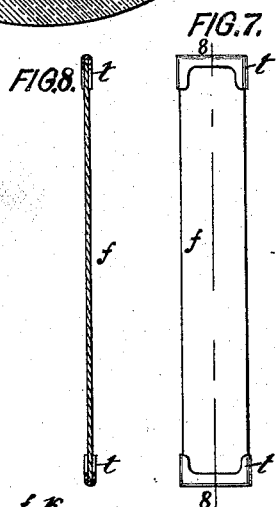
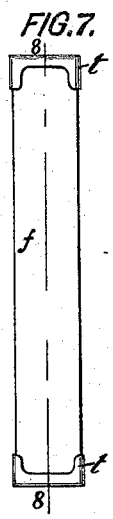
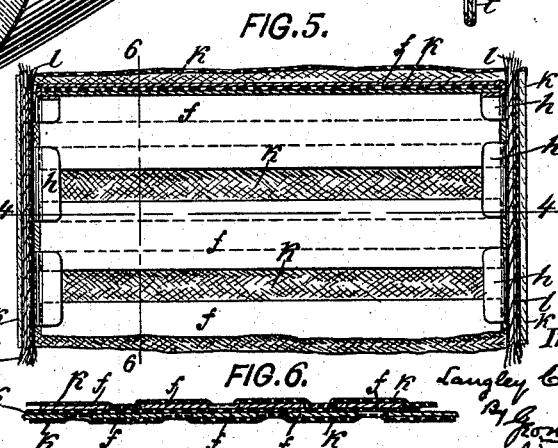
Witnesses:
John Becker
Inventor:
Langley Claxton
By Cyrus Baker
his attorney
THE NORRIS PETERS CO., PHOTO-LITHO., WASHINGTON, D. C.

(No Model.) 2 Sheets—Sheet 2.

L. CLAXTON.
PNEUMATIC TIRE.

No. 573,444. Patented Dec. 22, 1896.

Witnesses:
John Becker
E. G. Duvall

Inventor:
Langley Claxton
By Geo. M. Baker
his attorney

UNITED STATES PATENT OFFICE.

LANGLEY CLAXTON, OF PATERSON, NEW JERSEY, ASSIGNOR OF ONE-FOURTH TO WILLIAM P. HERRMANN, OF SAME PLACE.

PNEUMATIC TIRE.

SPECIFICATION forming part of Letters Patent No. 573,444, dated December 22, 1896.

Application filed July 3, 1895. Serial No. 554,787. (No model.)

*To all whom it may concern:*

Be it known that I, LANGLEY CLAXTON, a citizen of the United States, residing at Paterson, in the county of Passaic and State of New Jersey, have invented a new and useful Improvement in Pneumatic Tires, of which the following is a specification.

My invention relates to pneumatic tires for bicycles and other vehicles; and the object of my improvement is to provide a tire which shall be not only strong and durable, but also one which cannot be punctured by any object over which the tire may pass.

My improvement consists, essentially, in interposing a practically impenetrable shield between the exterior tread and the interior air-chamber of the tire. This shield is composed of alternate strips of metal and canvas firmly cemented together, and the parts are so combined that it acts not only as a shield to the air-chamber, but adds to the strength of the tire.

The construction of my improved device as applied to pneumatic tires is shown in the accompanying drawings, in which—

Figure 9:
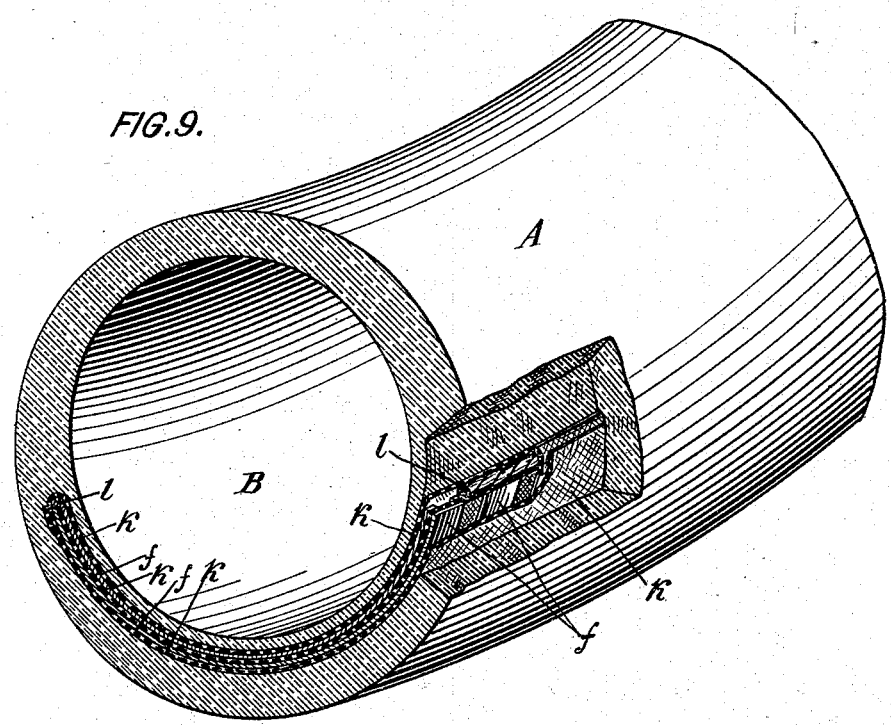
Figure 10:
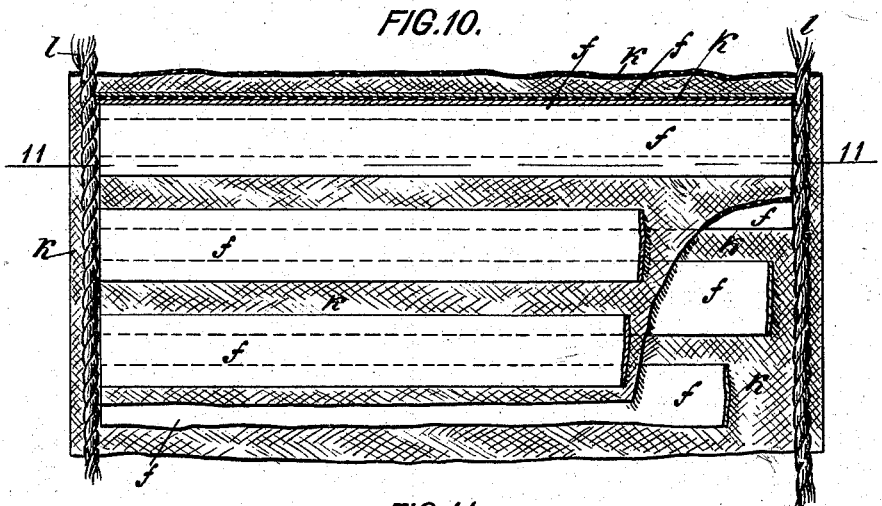
Figure 11:
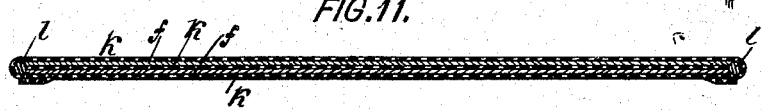

Figure 1 is a transverse section of a bicycle-tire embodying my invention, showing my improved shield inserted between the exterior rubber sheathing of the tire and an interior inflatable tube. Fig. 2 is a transverse section of a bicycle-tire embodying my invention, showing the shield incorporated in the rubber tread of the inflatable tire. Figs. 3 and 9 are perspective views of a portion of the tire shown in Fig. 2, a part of the exterior of the tire being broken away, disclosing the shield within. In these figures also a portion of the outer canvas covering of the shield is removed to show the arrangement of the interior parts of said shield. Fig. 4 is a transverse section of one form of the shield on the line 4 4 of Fig. 5 as it appears when inserted in the tire. Fig. 5 is a plan view of a portion of the shield shown in Fig. 3. In this figure the shield is represented as flat, that being its form before insertion in the tire, and the outer canvas covering of the shield is removed, showing the metallic strips beneath. Fig. 6 is a longitudinal section of the shield on the line 6 6 of Fig. 5. Fig. 7 is a plan view of one of the metallic strips having its ends sheathed with shoes or caps. Fig. 8 is a longitudinal section of a metallic strip on the line 8 8 of Fig. 7. Fig. 10 is a plan view of a portion of the shield, the outer sheet of canvas being removed and parts of some of the metallic strips in the outer layer, a portion of the middle sheet of canvas and parts of some of the metallic strips in the inner layer being broken away to show the arrangement of the several parts of the shield. Fig. 11 is a transverse section of the shield on the line 11 11 of Fig. 10.

A is the outer shell of the tire.
B is the interior air-chamber.
C is the interior inflatable tube.
D is the interposed impenetrable shield. The shield D consists of two layers of separate strips of metal $f$, preferably of steel, inclosed between three alternate pieces of canvas $k$, one piece of canvas being between the two layers of metallic strips and one piece being on the outer surface of each of said layers of metallic strips, as shown in Fig. 10, the whole being firmly fastened together by means of cement to form practically one piece.

The metallic strips $f$ are thin and about three-eighths of an inch in width and of sufficient length to span the entire tread of the tire, or somewhat less than half the transverse circumference of the tire. The metallic strips are arranged parallel to each other and transversely to the periphery of the wheel, and the distance between the strips is about one-half the width of the strip. The two layers of metallic strips are so placed with reference to each other that the strips in the outer layer are staggered over those in the inner layer, as shown in Figs. 5, 6, and 10.

The ends of the strips $f$ may be covered with caps or shoes, as shown at $t$ in Figs. 7 and 8, or they may be unsheathed, as shown in Figs. 9, 10, and 11, or the strips in the inner layer may be made a little longer than those in the outer layer and the ends of the former turned up and folded down over the ends of the latter, as shown at $h$ in Figs. 3 and 5, without in any way affecting the principle of my invention.

It is evident that in the spaces between the metallic strips the outer and inner sheets of canvas come into contact with the intermediate sheet, and when cemented together, as above described, each metallic strip is inclosed in a pocket, thereby preventing any lateral change in its position.

Along the ends of the metallic strips $f$ and in contact with them and inclosed in the same canvas covering as are said strips is a silken cord $l$ or similar soft packing, which acts as a cushion or fender between the ends of the strips and the rubber of the tire.

The component parts of the shield D, constructed as above described, are held firmly in their respective places and cannot move or ride upon each other, and the shield is rendered strong and pliable, presenting an unbroken metallic surface to any object which may succeed in penetrating the tread of the tire. Not only is this shield an effective protection to the inner air-chamber, but by reason of its peculiar construction the tire is greatly strengthened, not interfering with its resiliency or adding materially to its weight.

The shield D may be incorporated in the rubber tread of the outer shell of the tire, as shown in Figs. 2, 3, and 9, or it may be inserted between an exterior shell and an interior inflatable air-tube, as shown in Fig. 1. In the latter case the shield is inserted in the tire in the same manner as the inner tube itself is inserted or in any other suitable way, and is held in position by the inflated inner tube.

When the shield D is incorporated in the rubber of the tread of the tire or is inserted between the exterior shell and the interior inflatable tube, the metallic strips may be given a semicircular shape to conform them to the curve of the tire, or the metallic strips being straight, light, and yielding will readily adapt themselves to the curve of the tire, assuming a semicircular shape, thus making the shield semicircular in form.

I am aware that heretofore wire braid and metallic plates have been used in pneumatic tires to prevent them from being punctured, and I do not therefore claim, broadly, the use of such materials for that purpose.

What I claim is—

In a pneumatic tire, the combination of a series of metallic strips interposed between the interior air-chamber and the tread of the tire, the said strips being arranged in layers transversely to the tire, the strips of one layer covering the joints of the next layer, and a silken or other soft cord arranged along the edges of said metallic strips but disconnected therefrom whereby it forms a flexible fender or cushion between the metallic strips and the other parts of the tire, substantially as and for the purpose specified.

LANGLEY CLAXTON.

Witnesses:
WM. W. WELCH,
G. HENENSTEIN.